United States Patent
Noel et al.

(10) Patent No.: US 12,524,402 B2
(45) Date of Patent: Jan. 13, 2026

(54) SYSTEMS AND METHODS FOR USING CONSTRAINTS TO GENERATE DATABASE QUERIES

(71) Applicant: ServiceNow, Inc., Santa Clara, CA (US)

(72) Inventors: Pierre-Andre Noel, Montreal (CA); Hector Palacios, Montreal (CA); Thierry Moisan, Montreal (CA)

(73) Assignee: ServiceNow, Inc., Santa Clara, CA (US)

( * ) Notice: Subject to any disclaimer, the term of this patent is extended or adjusted under 35 U.S.C. 154(b) by 531 days.

(21) Appl. No.: 17/970,855

(22) Filed: Oct. 21, 2022

(65) Prior Publication Data

US 2023/0128290 A1    Apr. 27, 2023

Related U.S. Application Data

(60) Provisional application No. 63/270,349, filed on Oct. 21, 2021.

(51) Int. Cl.
*G06F 16/2452* (2019.01)
*G06F 16/242* (2019.01)

(52) U.S. Cl.
CPC .... *G06F 16/24522* (2019.01); *G06F 16/2425* (2019.01)

(58) Field of Classification Search
CPC . G06F 16/24522; G06F 16/2425; G10L 15/32
See application file for complete search history.

(56) References Cited

U.S. PATENT DOCUMENTS

| 9,805,077 B2 * | 10/2017 | Draese | G06F 16/221 |
| 2004/0054639 A1 * | 3/2004 | Muno, Jr. | G16H 70/60 |

(Continued)

FOREIGN PATENT DOCUMENTS

| CA | 2963808 A1 | 10/2017 |
| EP | 3534284 A1 | 9/2019 |

OTHER PUBLICATIONS

Anonymous authors, "(Unconstrained) Beam Search Is Sensitive To Large Search Discrepancies", Under Review as a Conference Paper at ICRL 2019, p.p. 1-18.

(Continued)

*Primary Examiner* — Bhavesh M Mehta
*Assistant Examiner* — Edward Tracy, Jr.
(74) *Attorney, Agent, or Firm* — FLETCHER YODER PC (57) ABSTRACT

There is disclosed a method of and a system for generating a database query. A natural language input for requesting data from a database is received. A first portion of the natural language input is input to a first machine learning algorithm (MLA). A second portion of the natural language input is input to a second MLA. The first MLA outputs a first probability distribution. The second MLA outputs a second probability distribution. One or more sets of classes from the first probability distribution and the second probability distribution that satisfy a plurality of constraints are determined. A predicted probability is determined for each of the one or more sets of classes. A set of classes having a highest predicted probability from the one or more sets of classes is selected. A database query is generated based on the set of classes.

18 Claims, 7 Drawing Sheets

(56) References Cited

U.S. PATENT DOCUMENTS

| | | | |
|---|---|---|---|
| 2008/0056578 | A1 | 3/2008 | Shilman et al. |
| 2009/0055176 | A1* | 2/2009 | Hu .................... G10L 15/08 |
| | | | 704/E15.001 |
| 2010/0121638 | A1* | 5/2010 | Pinson .................... G10L 15/02 |
| | | | 704/235 |
| 2017/0193042 | A1* | 7/2017 | Yung .................... G06F 16/2453 |
| 2017/0364831 | A1 | 12/2017 | Ghosh et al. |
| 2018/0121807 | A1 | 5/2018 | Wick et al. |
| 2018/0306459 | A1 | 10/2018 | Turney |
| 2019/0340524 | A1 | 11/2019 | Kirchhoff et al. |
| 2020/0184020 | A1 | 6/2020 | Hashimoto et al. |
| 2021/0073617 | A1 | 3/2021 | Bazzani et al. |
| 2022/0012433 | A1 | 1/2022 | Sawal et al. |
| 2023/0017396 | A1* | 1/2023 | Weerasinghe ...... G06F 21/6227 |

OTHER PUBLICATIONS

Strauss et al., "Regular expressions for decoding of neural networkoutputs", Neural networks: the official journal of the International Neural Network Society, vol. 79, 2016, pp. 1-25.

Office Action with regard to the counterpart CA Patent Application No. 3,094,683 mailed Nov. 10, 2021.

Poole, D.L. et al., "Artificial Intelligence—Foundations of Computational Agents", Cambridge University Press, New York, 1st Ed., Jan. 31, 2010, retrieved from https://www.researchgate.net/file.PostFileLoader.html?id=5440e3bdd5a3f298288b45fe&assetKey=AS%3A273625985290242%401442248926315 on Nov. 2, 2021, 682 pages.

Office Action with regard to the counterpart CA Patent Application No. 3,094,680 mailed Nov. 8, 2021.

International Search Report and Written Opinion with regard to PCT/IB2021/058951 mailed Jan. 25, 2022.

Yang, W. et al., "Output-Constrained Bayesian Neural Networks", arXiv.org, v1, May 15, 2019, pp. 1-7.

Arulkumaran, K. et al., "A Brief Survey of Deep Reinforcement Learning", arXiv.org, v2, Sep. 28, 2017, pp. 1-16.

Raghu, P.P. et al., "Supervised Texture Classification Using a Probabilistic Neural Network and Constraint Satisfaction Model", IEEE Transactions on Neural Networks, vol. 9, No. 3, May 31, 1998, pp. 516-522.

Chandrasekara, V. et al., "An Improved Probabilistic Neural Network Model for Directional Prediction of a Stock Market Index", Appl. Sci. 2019, 9(24), 5334; Dec. 6, 2019, pp. 1-21.

Lorenzi, M. et al., "Constraining the Dynamics of Deep Probabilistic Models", arXiv.org, v2, Jun. 18, 2018, pp. 1-13.

Scheidl, "Word Beam Search: A CTC Decoding Algorithm", Jul. 19, 2018, retrieved on https://towardsdatascience.com/word-beam-search-a-ctc-decoding-algorithm-b051d28f3d2e on Oct. 21, 2022, pdf 11 pages.

Notice of Allowance with regard to the counterpart U.S. Appl. No. 17/037,101 mailed Nov. 23, 2022.

Office Action with regard to the counterpart U.S. Appl. No. 17/037,046 mailed Oct. 12, 2023.

Scheidl et al., "Word Beam Search: A Connectionist Temporal Classification Decoding Algorithm", 2018, 16th International Conference on Frontiers in Handwriting Recognition, vol. 16 (2018), pp. 253-258 (Year: 2018).

Deutsch et al., "A General-Purpose Algorithm for Constrained Sequential Inference", 2019, Proceedings of the 23rd Conference on Computational Natural Language Learning (CoNLL), vol. 23, pp. 482-492 (Year: 2019).

Moore et al., "Juicer: A Weighted Finite-State Transducer Speech Decoder", 2006, MLMI 2006: Machine Learning for Multimodal Interaction, vol. 2006, pp. 285-296 (Year: 2006).

Yamazoe et al., "Hypothesis Preservation Approach to Scene Text Recognition with Weighted Finite-State Transducer", 2011, 2011 International Conference on Document Analysis and Recognition, vol. 2011, pp. 1-5 (Year: 2011).

Kim et al., "Accelerating RNN Transducer Inference via One-step Constrained Beam Search", Feb. 10, 2020, arXiv, v1, pp. 1-5 (Year: 2020).

Anderson et al., "Guided Open Vocabulary Image Captioning with Constrained Beam Search", 2017, arXiv, v2, pp. 1-14 (Year: 2017).

Chen et al., "Parallel Sentence Mining by Constrained Decoding", Jul. 2020, Proceedings of the 58th Annual Meeting of the Association for Computational Linguistics, vol. 58, pp. 1672-1678 (Year: 2020).

Hokamp et al., "Lexically Constrained Decoding for Sequence Generation Using Grid Beam Search", 2017, arXiv, v2, pp. 1-12 (Year: 2017).

Mohri et al., "Weighted Finite-State Transducer Algorithms. An Overview", 2004, Formai Languages and Applications, pp. 551-563 (Year: 2004).

Chowdhury et al., "A Weighted Finite-State Transducer (WFST)-Based Language Madel for Online Indic Script Handwriting Recognition", 2011, 2011 International Conference on Document Analysis and Recognition, vol. 2011, pp. 599-602 (Year: 2011).

* cited by examiner

SYSTEMS AND METHODS FOR USING CONSTRAINTS TO GENERATE DATABASE QUERIES

CROSS-REFERENCE TO RELATED APPLICATIONS

This application claims the benefit of U.S. Provisional Patent Application No. 63/270,349, filed Oct. 21, 2021, which is incorporated by reference herein in its entirety.

FIELD

The present technology relates to systems and methods for applying constraints to the output of machine learning algorithms (MLA). In particular, the present technology relates to systems and methods for generating database queries based on natural language input using MLAs and constraints.

BACKGROUND

Machine learning techniques have proven to be useful for a variety of applications. Machine learning algorithms (MLAs) can be trained to make predictions based on a set of labelled training data.

Because MLAs are not given a defined set of rules, but rather are trained, the MLAs can sometimes output predictions that are incompatible with known conditions, or a set of predictions that are incompatible with each other. These erroneous predictions can cause applications using the MLA to provide problematic outputs.

SUMMARY

MLAs may be trained to predict which class an input corresponds to. The MLA may output a probability distribution containing classes, and, for each class, a predicted probability that the input corresponds to that class. For example, an MLA may be trained to determine whether an image contains a cat or a dog. The MLA may output a probability distribution that includes a first predicted probability (i.e. a first predicted likelihood) that the image contains a cat (a first class) and a second predicted probability that the image contains a dog (a second class).

A pipeline of MLAs may be created that defines a plurality of steps. The pipeline of MLAs can include any arrangement of MLAs, inputs, etc. Each MLA in the pipeline may output a probability distribution. In some instances, it may be helpful to apply human knowledge to the pipeline rather than relying solely on trained MLAs. For example a pipeline could be developed that receives an image of an invoice and creates a database entry corresponding to the invoice, where the database entry includes a vendor name from the invoice. The entity using this pipeline may have a pre-approved list of vendors. In order to determine the vendor name, an optical character recognition (OCR) MLA may be used to identify the vendor name in the image of the invoice. The OCR MLA may output a probability distribution including a set of words and, for each word, a predicted probability corresponding to that word. Rather than simply selecting the word with the highest probability in that list, a constraint may be applied to the pipeline that restricts the vendor name to the list of pre-approved vendors. Any words in the probability distribution that do not match a known vendor may be removed from the probability distribution. The constraint applies the existing knowledge of the list of vendors to the MLA pipeline, resulting in a more accurate database entry.

Users of a database may wish to access data in the database. For example, the users may wish to count the number of entries in the database that fit a specified criteria, or retrieve all database entries that satisfy a filter. The users may retrieve this data by writing database queries and applying the database queries to the database, such as using server query language (SQL) queries. Writing SQL queries may be difficult for users, such as users who are not familiar with computer programming. An MLA pipeline may be created that receives a natural language input, such as a text input, and generates a database query based on the natural language input. Constraints may be created and applied to the pipeline to assist in generating the database queries.

According to a first broad aspect of the present technology, there is provided a method for generating a database query, the method comprising: receiving a natural language input for requesting data from a database; inputting at least a first portion of the natural language input to a first machine learning algorithm (MLA), wherein the first MLA was trained to predict a type of request corresponding to the natural language input; inputting at least a second portion of the natural language input to a second MLA, wherein the second MLA was trained to predict a field in the database corresponding to the natural language input; outputting, by the first MLA, a first probability distribution comprising a first plurality of classes and a probability associated with each class; outputting, by the second MLA, a second probability distribution comprising a second plurality of classes and a probability associated with each class; determining one or more sets of classes from the first probability distribution and the second probability distribution that satisfy a plurality of constraints; determining, for each of the one or more sets of classes, a predicted probability associated with the respective set of classes; selecting a set of classes having a highest predicted probability from the one or more sets of classes; and generating, based on the set of classes, the database query.

In some implementations of the method, the method further comprises applying the database query to the database; and outputting a result of the database query.

In some implementations of the method, the method further comprises receiving user input; generating, based on the user input, an additional constraint; selecting a second set of classes having a highest predicted probability that satisfies the additional constraint and the plurality of constraints; and generating, based on the second set of classes, a second database query.

In some implementations of the method, each class of the second plurality of classes corresponds to a column of the database.

In some implementations of the method, the first plurality of classes comprises a first class corresponding to a request to output a list and a second class corresponding to a request to output a count.

In some implementations of the method, a constraint of the plurality of constraints comprises a rule that the set of classes can contain either the first class or the second class but not both the first class and the second class.

In some implementations of the method, the natural language input comprises text input.

According to another broad aspect of the present technology, there is provided a system comprising: at least one processor, and memory storing a plurality of executable instructions which, when executed by the at least one processor, cause the system to: receive a natural language input for requesting data from a database; input at least a first portion of the natural language input to a first machine learning algorithm (MLA), wherein the first MLA was trained to predict a type of request corresponding to the natural language input; input at least a second portion of the natural language input to a second MLA, wherein the second MLA was trained to predict a field in the database corresponding to the natural language input; output, by the first MLA, a first probability distribution comprising a first plurality of classes and a probability associated with each class; output, by the second MLA, a second probability distribution comprising a second plurality of classes and a probability associated with each class; generate, based on the first probability distribution and the second probability distribution, a joint probability distribution; remove, from the joint probability distribution, sets of classes that fail to satisfy a plurality of constraints; select a set of classes having a highest predicted probability in the joint probability distribution; and generate, based on the set of classes, a database query.

In some implementations of the system the instructions further cause the system to: apply the database query to the database; and output a result of the database query.

In some implementations of the system the instructions further cause the system to: receive user input; generate, based on the user input, an additional constraint; remove, from the joint probability distribution, sets of classes that fail to satisfy the additional constraint; select a second set of classes having a highest predicted probability in the joint probability distribution; and generate, based on the second set of classes, a second database query.

In some implementations of the system each class of the second plurality of classes corresponds to a column of the database.

In some implementations of the system the first plurality of classes comprises a first class corresponding to a request to output a list and a second class corresponding to a request to output a count.

In some implementations of the system a constraint of the plurality of constraints comprises a rule that the set of classes can contain either the first class or the second class but not both the first class and the second class.

According to another broad aspect of the present technology, there is provided a method comprising: receiving input data; retrieving a configuration for an MLA pipeline corresponding to the input data, wherein the MLA pipeline comprises a first machine learning algorithm (MLA), a second MLA, and one or more constraints; inputting the input data to the first MLA; inputting the input data to the second MLA; outputting, by the first MLA, a first probability distribution comprising a first plurality of classes and a probability associated with each class; outputting, by the second MLA, a second probability distribution comprising a second plurality of classes and a probability associated with each class; generating, based on the first probability distribution and the second probability distribution, a joint probability distribution; removing, from the joint probability distribution, sets of classes that fail to satisfy the one or more constraints; and outputting the joint probability distribution.

In some implementations of the method, the method further comprises selecting, from the joint probability distribution, a set of classes having a highest predicted probability; and outputting the set of classes.

In some implementations of the method, the method further comprises selecting, from the joint probability distribution, a set of classes having a highest predicted probability; and outputting a user interface based on the set of classes; receiving user input; generating, based on the user input, an additional constraint; removing, from the joint probability distribution, sets of classes that fail to satisfy the additional constraint; selecting, from the joint probability distribution, a second set of classes having a highest predicted probability; and outputting a second user interface based on the second set of classes.

In some implementations of the method, a constraint of the one or more constraints comprises an instruction that two classes are incompatible.

In some implementations of the method, the configuration indicates inputs and outputs for the first MLA, the second MLA, and each of the one or more constraints.

In some implementations of the method, the first MLA was trained using a training dataset, wherein the training dataset comprises a plurality of training data points, and wherein each training data point of the plurality of training data points comprises input data and a class of the first plurality of classes.

In some implementations of the method, the second MLA was trained using a second training dataset, wherein the second training dataset comprises a second plurality of training data points, and wherein each training data point of the plurality of training data points comprises input data and a class of the second plurality of classes. Various implementations of the present technology provide a non-transitory computer-readable medium storing program instructions for executing one or more methods described herein, the program instructions being executable by a processor of a computer-based system.

Various implementations of the present technology provide a computer-based system, such as, for example, but without being limitative, an electronic device comprising at least one processor and a memory storing program instructions for executing one or more methods described herein, the program instructions being executable by the at least one processor of the electronic device.

In the context of the present specification, unless expressly provided otherwise, a computer system may refer, but is not limited to, an "electronic device," a "computing device," an "operation system," a "system," a "computer-based system," a "computer system," a "network system," a "network device," a "controller unit," a "monitoring device," a "control device," a "server," and/or any combination thereof appropriate to the relevant task at hand.

In the context of the present specification, unless expressly provided otherwise, the expression "computer-readable medium" and "memory" are intended to include media of any nature and kind whatsoever, non-limiting examples of which include RAM, ROM, disks (e.g., CD-ROMs, DVDs, floppy disks, hard disk drives, etc.), USB keys, flash memory cards, solid state-drives, and tape drives. Still in the context of the present specification, "a" computer-readable medium and "the" computer-readable medium should not be construed as being the same computer-readable medium. To the contrary, and whenever appropriate, "a" computer-readable medium and "the" computer-readable medium may also be construed as a first computer-readable medium and a second computer-readable medium.

In the context of the present specification, unless expressly provided otherwise, the words "first," "second," "third," etc. have been used as adjectives only for the purpose of allowing for distinction between the nouns that they modify from one another, and not for the purpose of describing any particular relationship between those nouns.

Additional and/or alternative features, aspects and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The examples and conditional language recited herein are principally intended to aid the reader in understanding the principles of the present technology and not to limit its scope to such specifically recited examples and conditions. It will be appreciated that those skilled in the art may devise various arrangements which, although not explicitly described or shown herein, nonetheless embody the principles of the present technology and are included within its spirit and scope.

Furthermore, as an aid to understanding, the following description may describe relatively simplified implementations of the present technology. As persons skilled in the art would understand, various implementations of the present technology may be of greater complexity.

In some cases, what are believed to be helpful examples of modifications to the present technology may also be set forth. This is done merely as an aid to understanding, and, again, not to define the scope or set forth the bounds of the present technology. These modifications are not an exhaustive list, and a person skilled in the art may make other modifications while nonetheless remaining within the scope of the present technology. Further, where no examples of modifications have been set forth, it should not be interpreted that no modifications are possible and/or that what is described is the sole manner of implementing that element of the present technology.

Moreover, all statements herein reciting principles, aspects, and implementations of the present technology, as well as specific examples thereof, are intended to encompass both structural and functional equivalents thereof, whether they are currently known or developed in the future. Thus, for example, it will be appreciated by those skilled in the art that any block diagrams herein represent conceptual views of illustrative circuitry and/or illustrative systems embodying the principles of the present technology. Similarly, it will be appreciated that any flowcharts, flow diagrams, state transition diagrams, pseudo-code, and the like represent various processes which may be substantially represented in computer-readable media and so executed by a computer or processor, whether or not such computer or processor is explicitly shown.

The functions of the various elements shown in the figures, including any functional block labeled as a "processor," may be provided through the use of dedicated hardware as well as hardware capable of executing software in association with appropriate software. When provided by a processor, the functions may be provided by a single dedicated processor, by a single shared processor, or by a plurality of individual processors, some of which may be shared. In some embodiments of the present technology, the processor may be a general purpose processor, such as a central processing unit (CPU) or a processor dedicated to a specific purpose, such as a digital signal processor (DSP). Moreover, explicit use of the term a "processor" should not be construed to refer exclusively to hardware capable of executing software, and may implicitly include, without limitation, application specific integrated circuit (ASIC), field programmable gate array (FPGA), read-only memory (ROM) for storing software, random access memory (RAM), and non-volatile storage. Some or all of the functions described herein may be performed by a cloud-based system. Other hardware, conventional and/or custom, may also be included.

Software modules, or simply modules which are implied to be software, may be represented herein as any combination of flowchart elements or other elements indicating performance of process steps and/or textual description. Such modules may be executed by hardware that is expressly or implicitly shown. Moreover, it should be understood that one or more modules may include for example, but without being limitative, computer program logic, computer program instructions, software, stack, firmware, hardware circuitry, or a combination thereof.

Figure 1:
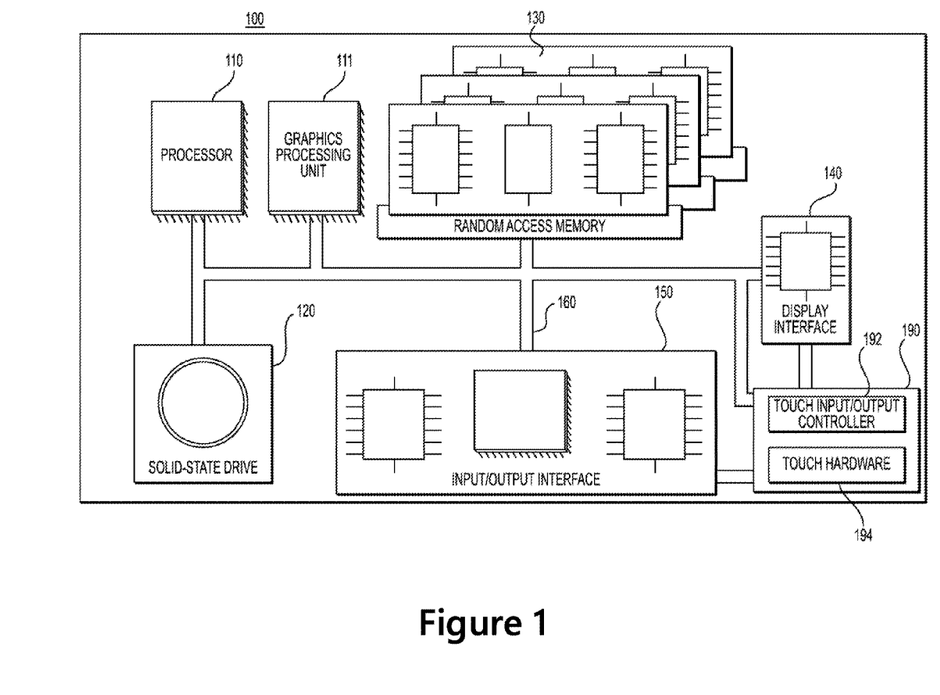
FIG. 1 is a block diagram of an example computing environment in accordance with various embodiments of the present technology.

FIG. 1 illustrates a computing environment 100, which may be used to implement and/or execute any of the methods described herein. In some embodiments, the computing environment 100 may be implemented by any of a conventional personal computer, a network device and/or an electronic device (such as, but not limited to, a mobile device, a tablet device, a server, a controller unit, a control device, etc.), and/or any combination thereof appropriate to the relevant task at hand. In some embodiments, the computing environment 100 comprises various hardware components including one or more single or multi-core processors collectively represented by processor 110, a solid-state drive 120, a random access memory 130, and an input/output interface 150. The computing environment 100 may be a computer specifically designed to operate a machine learning algorithm (MLA). The computing environment 100 may be a generic computer system.

In some embodiments, the computing environment 100 may also be a subsystem of one of the above-listed systems. In some other embodiments, the computing environment 100 may be an "off-the-shelf" generic computer system. In some embodiments, the computing environment 100 may also be distributed amongst multiple systems. The computing environment 100 may also be specifically dedicated to the implementation of the present technology. As a person in the art of the present technology may appreciate, multiple variations as to how the computing environment 100 is implemented may be envisioned without departing from the scope of the present technology.

Those skilled in the art will appreciate that processor 110 is generally representative of a processing capability. In some embodiments, in place of or in addition to one or more conventional Central Processing Units (CPUs), one or more specialized processing cores may be provided. For example, one or more Graphic Processing Units 111 (GPUs), Tensor Processing Units (TPUs), and/or other so-called accelerated processors (or processing accelerators) may be provided in addition to or in place of one or more CPUs.

System memory will typically include random access memory 130, but is more generally intended to encompass any type of non-transitory system memory such as static random access memory (SRAM), dynamic random access memory (DRAM), synchronous DRAM (SDRAM), read-only memory (ROM), or a combination thereof. Solid-state drive 120 is shown as an example of a mass storage device, but more generally such mass storage may comprise any type of non-transitory storage device configured to store data, programs, and other information, and to make the data, programs, and other information accessible via a system bus 160. For example, mass storage may comprise one or more of a solid state drive, hard disk drive, a magnetic disk drive, and/or an optical disk drive.

Communication between the various components of the computing environment 100 may be enabled by a system bus 160 comprising one or more internal and/or external buses (e.g., a PCI bus, universal serial bus, IEEE 1394 "Firewire" bus, SCSI bus, Serial-ATA bus, ARINC bus, etc.), to which the various hardware components are electronically coupled.

The input/output interface 150 may allow enabling networking capabilities such as wired or wireless access. As an example, the input/output interface 150 may comprise a networking interface such as, but not limited to, a network port, a network socket, a network interface controller and the like. Multiple examples of how the networking interface may be implemented will become apparent to the person skilled in the art of the present technology. For example the networking interface may implement specific physical layer and data link layer standards such as Ethernet, Fibre Channel, Wi-Fi, Token Ring or Serial communication protocols. The specific physical layer and the data link layer may provide a base for a full network protocol stack, allowing communication among small groups of computers on the same local area network (LAN) and large-scale network communications through routable protocols, such as Internet Protocol (IP).

The input/output interface 150 may be coupled to a touchscreen 190 and/or to the one or more system buses 160. The touchscreen 190 may be part of the display. In some embodiments, the touchscreen 190 is the display. The touchscreen 190 may equally be referred to as a screen 190. In the embodiments illustrated in FIG. 1, the touchscreen 190 comprises touch hardware 194 (e.g., pressure-sensitive cells embedded in a layer of a display allowing detection of a physical interaction between a user and the display) and a touch input/output controller 192 allowing communication with the display interface 140 and/or the one or more system buses 160. The display interface 140 may include and/or be in communication with any type and/or number of displays. In some embodiments, the input/output interface 150 may be connected to a keyboard (not shown), a mouse (not shown) or a trackpad (not shown) allowing the user to interact with the computing environment 100 in addition to or instead of the touchscreen 190.

According to some implementations of the present technology, the solid-state drive 120 stores program instructions suitable for being loaded into the random access memory 130 and executed by the processor 110 for executing acts of one or more methods described herein. For example, at least some of the program instructions may be part of a library or an application.

Pipeline with Machine Learning Algorithms (MLAs)

Figure 2:
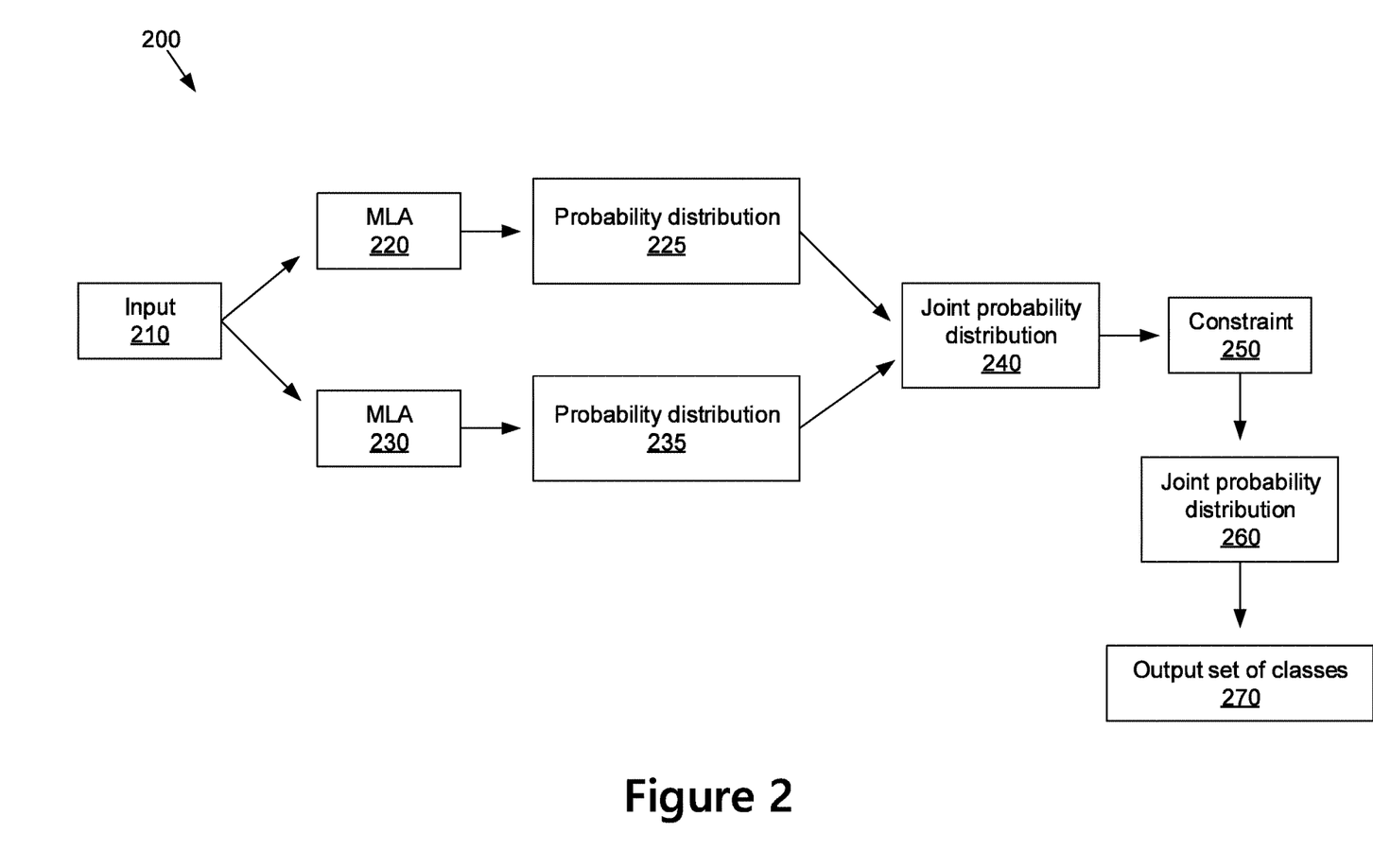
FIG. 2 is a diagram illustrating an MLA pipeline with a constraint in accordance with various embodiments of the present technology.
Figure 3:
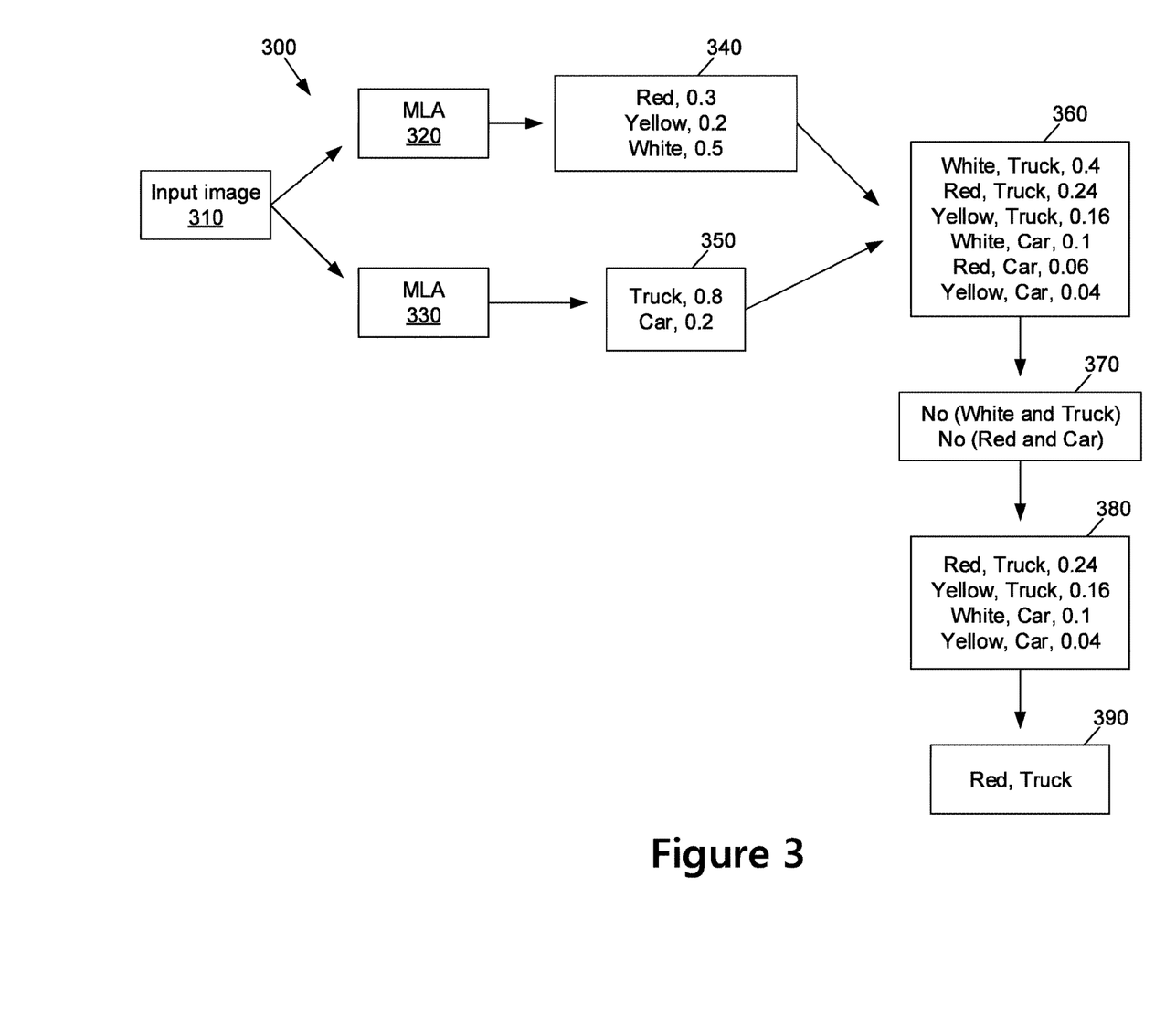
FIG. 3 is a diagram illustrating an example of the MLA pipeline of FIG. 2 in accordance with various embodiments of the present technology.
Figure 5:
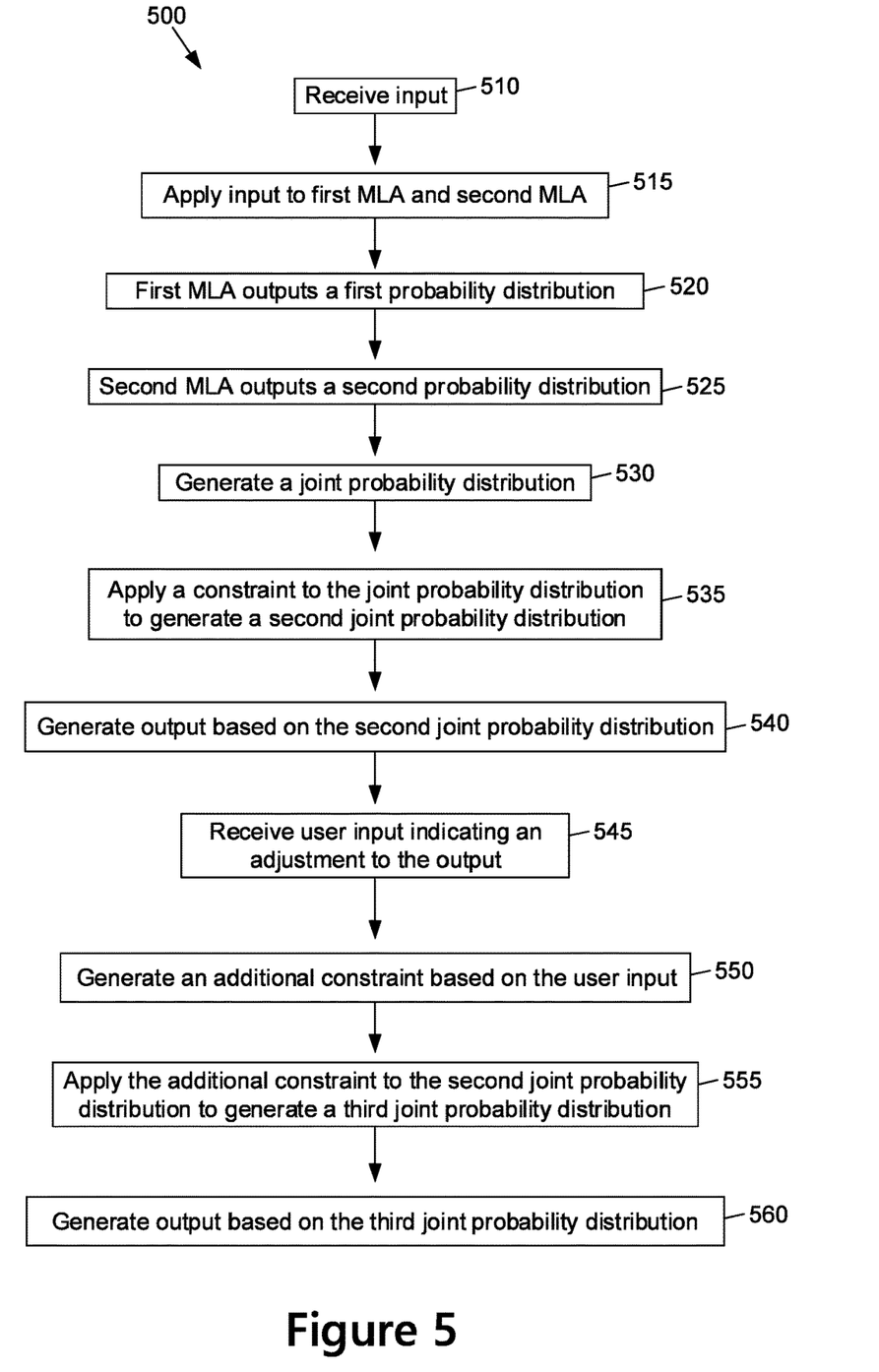
FIG. 5 is a flow diagram of a method for applying constraints to MLA outputs in accordance with various embodiments of the present technology.

FIG. 2 is a diagram illustrating an MLA pipeline 200 with a constraint in accordance with various embodiments of the present technology. The MLA pipeline 200 illustrates one example configuration of an MLA pipeline, and it should be understood that various other configurations of an MLA pipeline may be used. FIGS. 3 and 5 illustrate examples of other configurations of an MLA pipeline. The MLA pipeline 200 may be configured for a specific task. The MLA pipeline 200 may be configured to receive an input 210 and output an output set of classes 270, where the output set of classes 270 is a set of classes having a highest predicted probability to correspond to the input 210 that also satisfies all constraints in the MLA pipeline 200.

In the MLA pipeline 200 input 210 is input to an MLA 220 and an MLA 230. The input may be in any format, such as an image, natural language input, audio, etc. The MLAs 220 and 230 may have been trained to process the type of input of the input 210. For example the input 210 may be seismic data measured by a seismometer, and the MLA 220 may have been trained to receive seismic data as input and predict whether the seismic data corresponds to a first class indicating normal activity or a second class indicating nuclear testing. Although the MLA 220 and MLA 230 receive the same input 210 in the MLA pipeline 200, it should be understood that the MLA 220 and MLA 230 might receive different input data.

The MLA 220 and the MLA 230 may include any type and/or combination of MLA. The MLA 220 may include a neural network, tree-based algorithm, and/or any other type of MLA. The MLA 230 may contain a same or different type of MLA as the MLA 220.

The MLA 220 outputs a probability distribution 225. The MLA 230 outputs a probability distribution 235. The probability distributions 225 and 235 may each include multiple classes, and a probability for each possible class that the MLA was trained to predict or a probability for each class of a subset of the possible classes. In the example given above where the MLA 220 predicts whether seismic data corresponds to normal activity or nuclear testing, the probability distribution 225 may include a first probability that the seismic data corresponds to normal activity and a second probability that the seismic data corresponds to nuclear testing. The probabilities in the probability distribution 225 may sum to one. Similarly, the sum of all probabilities in the probability distribution 235 may be one. The probability distribution 225 and/or probability distribution 235 may be partial probability distributions, in which case the sum of all probabilities in the probability distribution 225 or probability distribution 235 may be less than one. For example a maximum size of five may be set for the probability distribution 225, and the five classes having the highest probability may be included in the probability distribution 225, whereas the other classes having lower probabilities might not be included in the probability distribution 225.

The probability distribution 225 and probability distribution 235 may be combined to form a joint probability distribution 240. The joint probability distribution 240 may be formed by multiplying the probabilities in the probability distribution 225 and the probability distribution 235. The joint probability distribution 240 may contain sets of classes and a probability associated with each set of classes. A set of classes in the joint probability distribution 240 may include a first class from the probability distribution 225 and a second class from the probability distribution 235. The probability associated with this set of classes may be the product of the probability of the first class and the probability of the second class. The joint probability distribution 240 may be in any suitable format and/or generated using any suitable method for generating a joint probability distribution.

A constraint 250 may be applied to the joint probability distribution 240. A constraint be a function and/or a formula that express a combination of classes that should not be output. The constraint 250 may include one or more rules. The constraint 250 may indicate sets of classes that are not permitted. Each set of classes in the joint probability distribution 240 may be applied to the constraint 250. If a set of classes does not satisfy the constraint 250, that set of classes and the associated probability may be removed from the joint probability distribution 240. The constraint 250 may output the joint probability distribution 260. The joint probability distribution 260 might not contain any sets of classes that fail to satisfy the constraint 250. An output set of classes 270 may be selected from the sets of classes in the joint probability distribution 260. The output set of classes 270 may be the set of classes having the highest probability of the joint probability distribution 260.

The constraint 250 may be pre-defined by a user and/or generated automatically. The constraint 250 may be generated using a template. A user may enter input to complete the template, and the constraints may be generated based on the user input. A program may be written to generate constraints. The program may retrieve data from a database to generate constraints.

Although the constraint 250 is illustrated as being applied to the joint probability distribution 240, it should be understood that other implementations are envisioned. The constraint 250 may be applied to the probability distribution 225 and/or the probability distribution 235. In this case, the joint probability distribution 240 might not be generated. Rather than generating a probability for all possible combination of classes in the probability distributions 225 and 235, probabilities may be determined for the sets of classes that satisfy the constraint 250. Then, a set of classes having the highest probability that satisfies the constraint 250 may be selected as the output set of classes 270.

Example Use-Case of MLA Pipeline 200

FIG. 3 is a diagram illustrating an example of the MLA pipeline 200 in accordance with various embodiments of the present technology. The MLA pipeline 300 illustrated in FIG. 3 is configured to receive an input image 310 that is a picture of a vehicle. The MLA pipeline 300 outputs a probability distribution with a predicted color and type of the vehicle in the input image 310. The MLA 320 predicts a color of the vehicle in the input image 310. The set of available classes for the MLA 320 includes the classes "Red", "Yellow", and "White". The MLA 330 predicts a type of the vehicle in the input image 310. The set of available classes for the MLA 330 includes the class "Truck" and the class "Car".

The MLA 320 and MLA 330 may have previously been trained using labelled training data. A training dataset may have been input to the MLA 320 and the MLA 330, where the training dataset included a set of training data points. Each training data point may have included an image of a vehicle, a label indicating the type of the vehicle and/or a label indicating the color of the vehicle.

The MLA 320 outputs a probability distribution 340 that includes a predicted probability for each of the available classes, which in this instance are the colors red, yellow, and white. Similarly, the MLA 330 outputs a probability distribution that includes a predicted probability that the input image 310 corresponds to the class "Truck" (i.e. that the image contains a truck) and a predicted probability that the input image 310 corresponds to the class "Car" (i.e. that the image contains a car).

A joint probability distribution 360 is then generated based on the probability distribution 340 and the probability distribution 350. To determine the probability for a set of classes in the joint probability distribution 360, the probabilities for the corresponding classes from the probability distribution 340 and probability distribution 350 are multiplied together. For example, the probability for the set of classes "White, Truck" is determined as the product of the probability for the class "White" from the probability distribution 340 and the probability for the class "Truck" from the probability distribution 350.

The joint probability distribution 360 indicates that the input image 310 is most likely to contain a white truck, as that set of classes has the highest probability in the joint probability distribution 360. As described above, in some instances the joint probability distribution 360 might not be formed and/or constraints may be applied directly to the probability distributions 340 and/or 350.

Constraints 370 may be applied to the joint probability distribution 360. The constraints 370 may be generated based on known information. For example, it may be known that the MLA pipeline 300 is being used in a facility that does not produce white trucks or red cars. Because these combinations are known to be impossible, the constraints 370 indicate that the set of classes "White, Truck" and "Red, Car" are impossible. These sets of classes that do not satisfy the constraints 370 might not be output by the MLA pipeline 300.

After applying the constraints 370 to the joint probability distribution 360, a joint probability distribution 380 is generated. The joint probability distribution 380 does not include sets of classes that failed to satisfy the constraints 370. The joint probability distribution indicates that the set of classes having the highest probability is "Red, Truck" and thereby that the input image 310 is predicted to contain a red truck. Without the constraints, the set of classes with the highest predicted probability was a "White, Truck" as indicated in the joint probability distribution 360. But because it was known that a white truck was not a possibility, as indicated in the constraints 370, the joint probability distribution 380 indicates that the highest predicted probability is that the input image 310 contains a red truck. The output 390 of the MLA pipeline 300 is the set of classes that satisfy the constraints 370 and has the highest predicted probability. In this instance, the output 390 is the set of classes "Red, Truck". The output 390 may also include the predicted probability for the set of classes "Red, Truck".

Pipeline with Multiple Constraints

Figure 4:
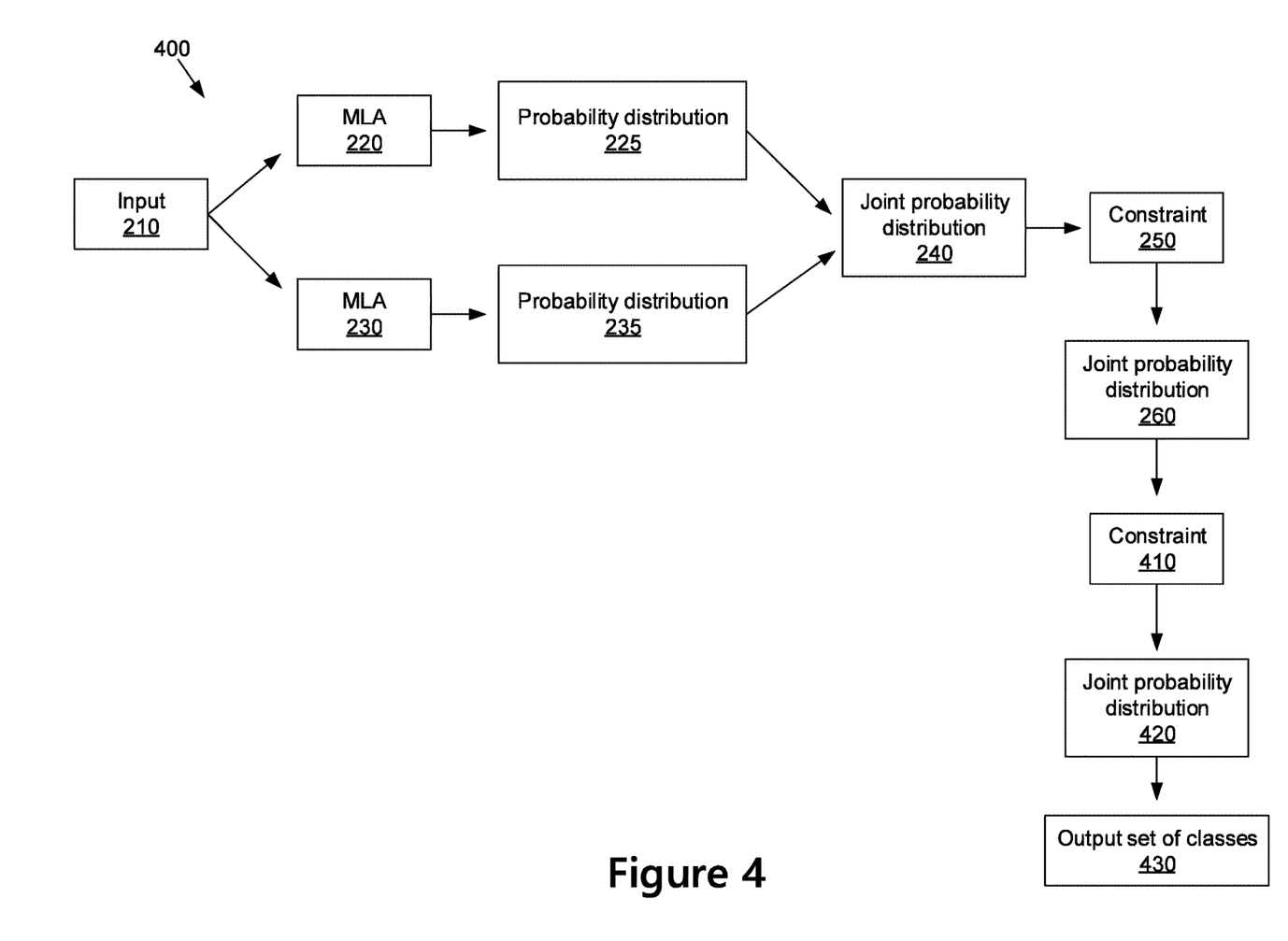
FIG. 4 is a diagram illustrating an MLA pipeline with multiple constraints in accordance with various embodiments of the present technology.

FIG. 4 is a diagram illustrating an MLA pipeline 400 with multiple constraints in accordance with various embodiments of the present technology. The MLA pipeline 400 is related to the MLA pipeline 200 but includes an additional constraint 410.

A user may adjust an MLA pipeline by adding and/or removing elements. The user may add and/or remove MLAs, constraints, and/or any other elements. The user may reconfigure the elements in the MLA pipeline. The user may adjust the MLA pipeline using a user interface, configuration file, and/or other methods for configuring an MLA pipeline. A user viewing the MLA pipeline 200 could add an additional MLA and constraint to the MLA pipeline 200, resulting in the MLA pipeline 400.

The user may interact with the output of an MLA pipeline, such as the output set of classes 270 of the MLA pipeline 200, to generate additional constraints. For example, if a user were to view the output 390 and then input that the image does not contain a red truck, an additional constraint may be added to the MLA pipeline 300 to generate a new output 390 after applying the constraint "No (Red and Truck)" to the joint probability distribution 380.

The MLA pipeline 400 illustrates an example of a constraint 410 being added to the MLA pipeline 200. The constraint 410 may be generated based on user input. The user may have viewed an interface generated based on the joint probability distribution 260 and then provided input to further refine the output of the MLA pipeline 400. The user input may be used to generate the constraint 410, which may then be applied to the joint probability distribution 260. A joint probability distribution 420 may be generated that includes sets of classes from the joint probability distribution 260 that satisfy the constraint 410. If a set of classes in the joint probability distribution 260 satisfies the constraint 410, that set of classes may be included in the joint probability distribution 420. If a set of classes in the joint probability distribution 260 fails to satisfy the constraint 410, that set of classes might not be included in the joint probability distribution 420. The sets of classes in the joint probability distribution may also satisfy the constraint 250.

Constraints might also be modified and/or removed from the MLA pipeline 200. User input may be received indicating that a constraint should be modified or removed. If a constraint is removed from a pipeline, any results and/or joint probability distributions that occurred prior to the constraint in the pipeline may be reused. Any results and/or joint probability distributions that occur after the previous location of the removed constraint might be re-calculated. For example in the MLA pipeline 400, if the constraint 250 were removed, the joint probability distribution 420 and the output set of classes 430 might be re-calculated. In this example with the constraint 250 removed, the joint probability distribution 260 might no longer be determined and instead the joint probability distribution 240 might feed directly into the constraint 410.

Although the MLA pipeline 400 shows the constraints 250 and 410 being applied to joint probability distributions 260 and 420, in some instances the constraints 250 and 410 may be applied directly to the probability distributions 225 and 235. In those instances, the joint probability distributions 260 and 420 might not be generated.

An output set of classes 430 of the MLA pipeline 400 may be generated based on the joint probability distribution 420 and/or the joint probability distribution 420 may be the output of the MLA pipeline 400. Adding the constraint 410 to the MLA pipeline 400 based on user input may allow the user to refine the output from the MLA pipeline 400 without re-executing the MLA 220 and/or the MLA 230. Applying the constraint 410 may be more efficient than re-executing the MLA 220 and/or MLA 230. The output set of classes 430 may be the set of classes having the highest predicted probability that satisfies each of the constraints 250 and 410.

Method of Applying Constraints

FIG. 5 is a flow diagram of a method 500 for applying constraints to MLA outputs in accordance with various embodiments of the present technology. The method 500 illustrates steps that may be performed while executing the MLA pipeline 400.

In one or more aspects, the method 500 or one or more steps thereof may be performed by a computing system, such as the computing environment 100. The method 500 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

At step 510 input may be received, such as the input 210. The input may be in any format, such as text, image, audio, and/or any other type of data. For example an MLA pipeline may be created for performing OCR, in which case an image containing text may be received at step 510. Multiple inputs may be received at step 510. The types of input to be received at step 510 may be defined in the MLA pipeline.

At step 515 the input may be applied to a first MLA and a second MLA, such as the MLA 220 and the MLA 230. The first and second MLA may have been trained to predict the probability that the input corresponds to various classes. The MLAs may include any type and/or combination of MLA, such as neural networks.

At step 520 the first MLA may output a first probability distribution, such as the probability distribution 225. At step 525 the second MLA may output a second probability distribution, such as the probability distribution 235. Each probability distribution may include classes and, for each class, a corresponding probability.

At step 530 a joint probability distribution may be generated, such as the joint probability distribution 240. The joint probability distribution may be generated based on the probability distributions output by the first MLA and the second MLA at steps 520 and 525. The joint probability distribution may contain sets of classes, and for each set of classes, a corresponding probability.

At step 535 a constraint may be applied to the joint probability distribution, such as the constraint 250. Any number of constraints may be applied to the joint probability distribution. The constraints may be applied to each set of classes in the joint probability distribution. The constraints may be pre-defined rules that can be applied to individual sets of classes in the joint probability distribution. The constraint may output a binary output indicating either that the set of classes satisfies or fails to satisfy the constraint.

Any set of classes in the joint probability distribution that does not satisfy the constraint may be removed. A second joint probability distribution, such as the joint probability distribution 240, may be generated. The second joint probability distribution may include the sets of classes, from the joint probability distribution generated at step 530, that satisfy the constraint.

At step 540 output may be generated based on the second joint probability distribution. The output may be output to a user, such as by being displayed to the user. All or a portion of the second joint probability distribution may be output to the user. Output may be generated based on the second joint probability distribution. Output may be generated based on the set of classes having the highest predicted probability in the second joint probability distribution. For example, for the joint probability distribution 360 in FIG. 3, the output may be "The image contains a white truck."

At step 545 user input may be received. The user input may include user feedback based on the output from step 540. The user input may indicate an adjustment to be made to the output.

At step 550 an additional constraint may be generated based on the user input, such as the constraint 410. The user input may have indicated that a class and/or combination of classes should be excluded. An additional constraint may be generated to exclude that class and/or combination of classes. For example, in the MLA pipeline 300, a user may enter input at step 545 indicating that the input image 310 does not contain a truck. In this example, at step 550 an additional constraint may be generated that causes all sets of classes that correspond to the class "truck" to be excluded.

At step 555 the additional constraint may be applied to the second joint probability distribution to generate a third joint probability distribution, such as the joint probability distribution 420. Any sets of classes in the second joint probability distribution that fail to satisfy the additional constraint may be filtered out and/or not included in the third joint probability distribution.

At step 560 output may be generated based on the third probability distribution. The user may further interact with the output, such as by entering additional input. Additional constraints may be generated based on the user input and the output may be further refined by repeating steps 545-60. The output may be the set of classes having the highest probability that satisfies each of the constraints.

Method of Generating Database Queries

Figure 6:
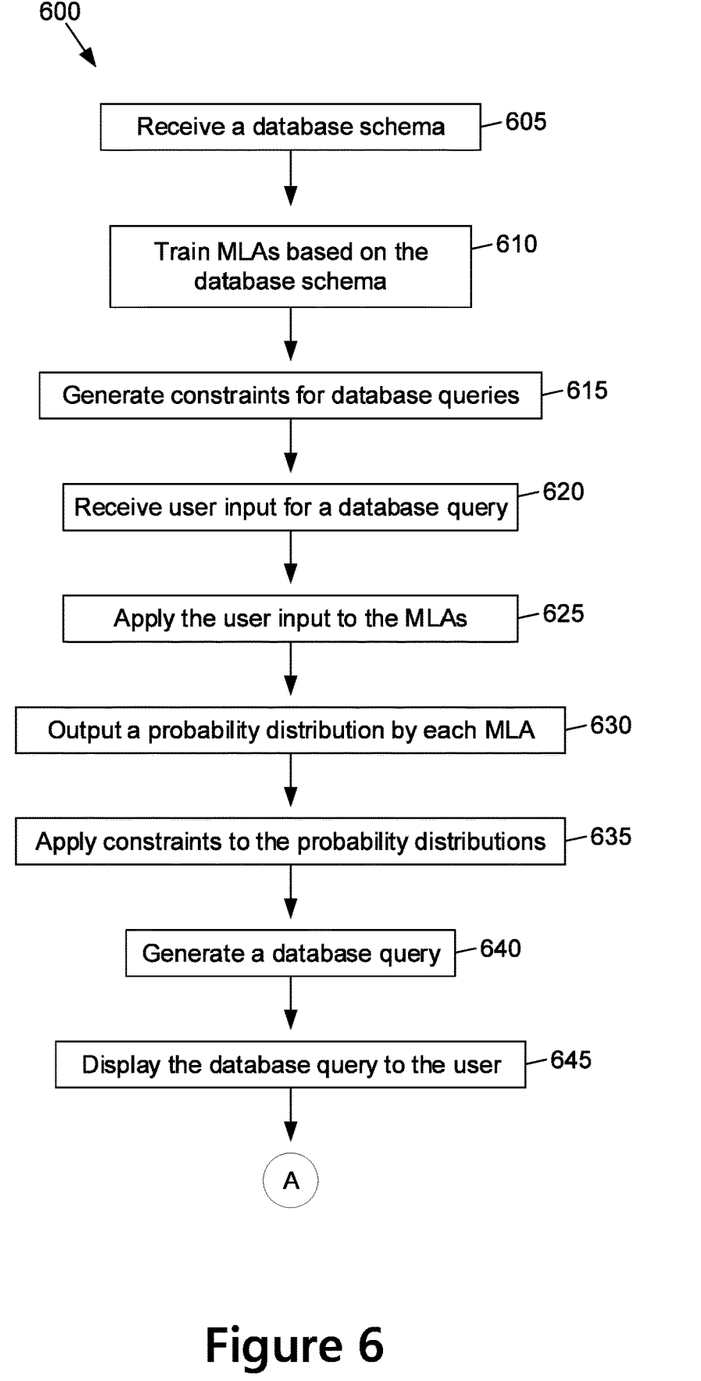
FIGS. 6 and 7 are a flow diagram of a method for generating database queries in accordance with various embodiments of the present technology.
Figure 7:
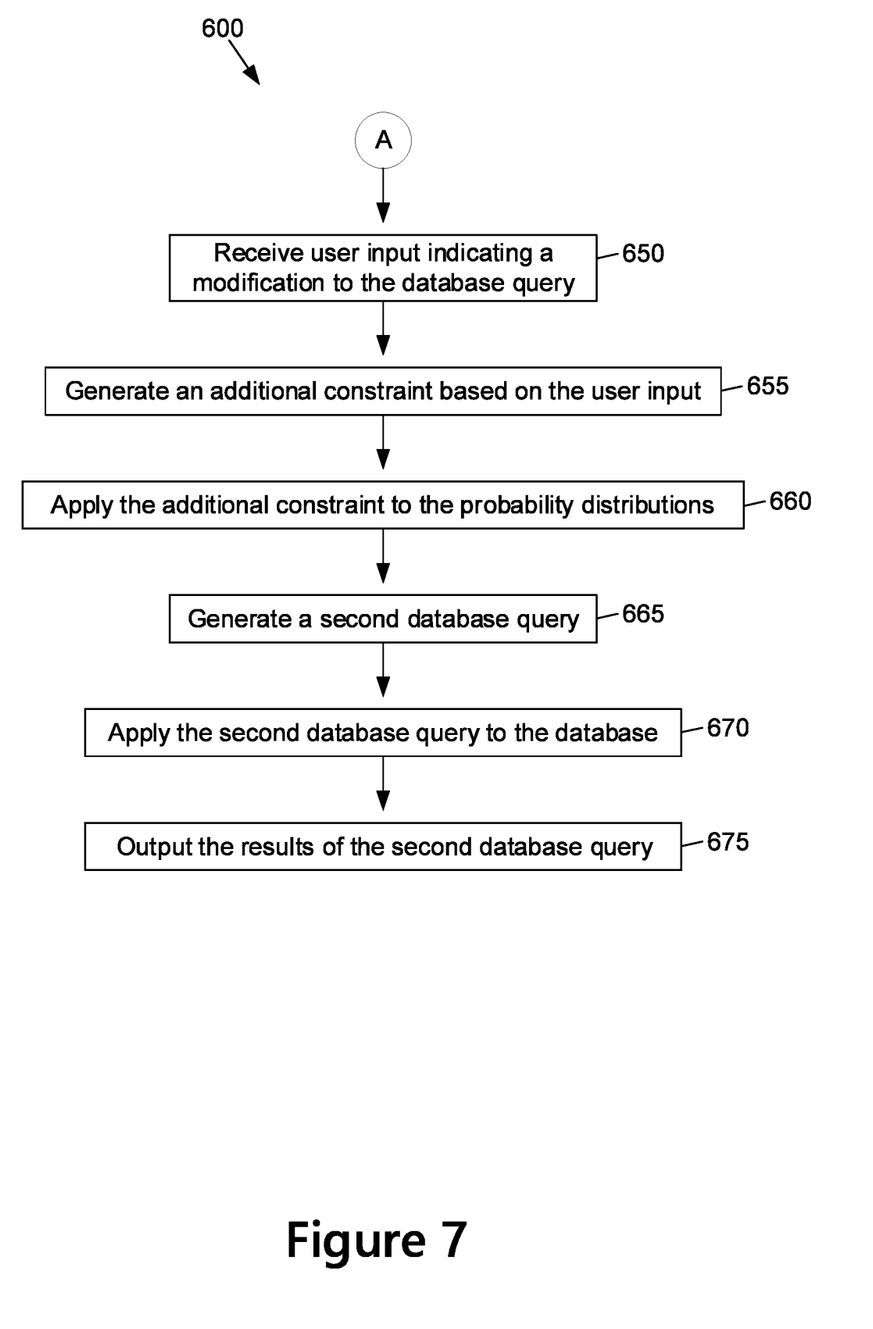

FIGS. 6 and 7 are a flow diagram of a method 600 for generating database queries in accordance with various embodiments of the present technology. In one or more aspects, the method 600 or one or more steps thereof may be performed by a computing system, such as the computing environment 100. The method 600 or one or more steps thereof may be embodied in computer-executable instructions that are stored in a computer-readable medium, such as a non-transitory mass storage device, loaded into memory and executed by a CPU. Some steps or portions of steps in the flow diagram may be omitted or changed in order.

At step 605 a database schema may be received. The database schema may describe an organization of the database. Other information may be received instead of or in addition to the database schema, such as a reference to the database, address of the database, type of data stored in each row and/or column of the database, and/or any other information regarding the database.

At step 610 MLAs may be trained based on the database schema. The MLAs may be classifiers. The MLAs may be trained based on columns in the database and/or any other characteristic of the database. The MLAs may be trained using training datasets, where each data point in the training dataset includes a natural language input and a label. The label may be all or a part of a database query such as an SQL query.

MLAs may be trained to predict a type of the request in the natural language input. The MLAs may predict whether the natural language input corresponds to a request to output a list, output a count, and/or any other type of request. Each type of request may constitute a class that the MLA is trained to predict a probability for.

MLAs may be trained to determine which field in the database should be selected and/or which field should be included in a "select" section of a database query. MLAs may be trained to determine which field in the database to filter and/or determine which field should be included in a "where" section of a database query. Other MLAs may be generated based on the database schema. Each MLA may output a probability distribution.

At step 615 constraints may be generated. Constraints may be created using categorical variables. For example, a constraint may indicate that if a question type is count, then exactly one field is to be selected to be counted. A constraint may indicate that if a question type is a filter, then at least one field may be selected for the filter. An MLA pipeline may be generated using the MLAs and/or constraints. After generating the MLA pipeline at steps 605-15, the MLA pipeline may be used to generate database queries.

At step 620 user input may be received. The user input may be in the form of a question. The user input may be natural language input. The user input may be typed input, voice input, and/or any other type of natural language input.

At step 625 the user input may be applied to the MLAs that were trained at step 610. The user input may be input to each of the MLAs. The input may be in a same format as the format used for training the MLA. For example, if the MLA was trained using text as input, the user input may input as text.

At step 630 each MLA may output a probability distribution. Each probability distribution may include classes and a probability for each class.

At step 635 the constraints generated at step 615 may be applied to the output of the probability distributions. Joint probability distributions may be formed based on the probability distributions. The constraints may be applied to the joint probability distributions.

At step 640 a database query may be generated based on the output of the constraints. A set of categories having the highest probability in the joint probability distribution may be selected. The database query may be generated based on the selected set of categories. The constraints may constitute a template used to form the database query. The output of the constraints may be the database query.

At step 645 the database query may be displayed to the user. The actual database query may be displayed to the user and/or the database query may be displayed in a natural language format. The results of applying the database query to the database may be displayed.

At step 650 user input may be received. The user input may indicate a modification to the database query and/or the results of the database query.

At step 655 additional constraints may be generated based on the user input. Any number of constraints may be generated. For example, if the database query generated at step 640 caused a list to be output, but the user input at step 650 indicates that the user would like a count to be output, the constraint may indicate that any sets of classes corresponding to a list should be filtered out.

At step 660 the additional constraints generated at step 655 may be applied to the probability distributions. An updated joint probability distribution may be output by the constraints. Although steps 655 and 660 describe adding additional constraints, in addition to or instead of adding constraints, existing constraints may be modified and/or removed based on the user input received at step 650.

At step 665 a second database query may be generated. Actions performed at step 665 may be similar to those performed at step 640.

At step 670 the second database query may be applied to the database. At step 675 the results of the second database query may be output to the user. If the user enters additional input, the method 600 may return to step 650 and additional constraints may be generated based on the user input, constraints may be modified based on the user input, and/or constraints may be removed based on the user input.

While some of the above-described implementations may have been described and shown with reference to particular acts performed in a particular order, it will be understood that these acts may be combined, sub-divided, or re-ordered without departing from the teachings of the present technology. At least some of the acts may be executed in parallel or in series. Accordingly, the order and grouping of the act is not a limitation of the present technology.

It should be expressly understood that not all technical effects mentioned herein need be enjoyed in each and every embodiment of the present technology.

As used herein, the wording "and/or" is intended to represent an inclusive-or; for example, "X and/or Y" is intended to mean X or Y or both. As a further example, "X, Y, and/or Z" is intended to mean X or Y or Z or any combination thereof.

The foregoing description is intended to be exemplary rather than limiting. Modifications and improvements to the above-described implementations of the present technology may be apparent to those skilled in the art.

What is claimed is:

1. A method of generating a database query, the method comprising:
   receiving a natural language input for requesting data from a database;
   inputting only a first portion of the natural language input to a first machine learning algorithm (MLA), wherein the first MLA was trained to predict a type of request corresponding to the natural language input;
   inputting only a second portion of the natural language input to a second MLA, wherein the second MLA was trained to predict a field in the database corresponding to the natural language input;
   outputting, by the first MLA, a first probability distribution comprising a first plurality of classes and a probability associated with each class;
   outputting, by the second MLA, a second probability distribution comprising a second plurality of classes and a probability associated with each class;
   determining one or more sets of classes from the first probability distribution and the second probability distribution that satisfy a plurality of constraints, wherein the plurality of constraints comprise rules applied to the first plurality of classes, the second plurality of classes, or both, to identify one or more excluded classes from the first plurality of classes and the second plurality of classes;
   determining, for each of the one or more sets of classes, a predicted probability associated with each respective set of classes;
   selecting a set of classes having a highest predicted probability from the one or more sets of classes;
   generating, based on the set of classes, the database query based on an output of the constraints and a schema of the database;
   executing the database query on the database; and
   transmitting for display, on a graphical user interface, results of the database query.

2. The method of claim 1, further comprising:
   receiving user input;
   generating, based on the user input, an additional constraint;
   selecting a second set of classes having a highest predicted probability that satisfies the additional constraint and the plurality of constraints; and
   generating, based on the second set of classes, a second database query.

3. The method of claim 1, wherein each class of the second plurality of classes corresponds to a column of the database.

4. The method of claim 1, wherein the first plurality of classes comprises a first class corresponding to a request to output a list and a second class corresponding to a request to output a count.

5. The method of claim 4, wherein a constraint of the plurality of constraints comprises a rule that the set of classes can contain either the first class or the second class but not both the first class and the second class.

6. The method of claim 1, wherein the natural language input comprises text input.

7. A system comprising:
   at least one processor, and
   memory storing a plurality of executable instructions which, when executed by the at least one processor, cause the system to:
   receive a natural language input for requesting data from a database;
   input only a first portion of the natural language input to a first machine learning algorithm (MLA), wherein the first MLA was trained to predict a type of request corresponding to the natural language input;
   input only a second portion of the natural language input to a second MLA, wherein the second MLA was trained to predict a field in the database corresponding to the natural language input;
   output, by the first MLA, a first probability distribution comprising a first plurality of classes and a probability associated with each class;
   output, by the second MLA, a second probability distribution comprising a second plurality of classes and a probability associated with each class;
   generate, based on the first probability distribution and the second probability distribution, a joint probability distribution;
   remove, from the joint probability distribution, sets of classes that fail to satisfy a plurality of constraints, wherein the plurality of constraints comprise rules applied to the first plurality of classes, the second plurality of classes, or both, to identify one or more excluded classes from the first plurality of classes and the second plurality of classes;
   select a set of classes having a highest predicted probability in the joint probability distribution;
   generate, based on the set of classes, a database query based on an output of the constraints and a schema of the database;
   executing the database query on the database; and
   transmitting for display, on a graphical user interface, results of the database query.

8. The system of claim 7, wherein the instructions further cause the system to:
   receive user input;
   generate, based on the user input, an additional constraint;
   remove, from the joint probability distribution, sets of classes that fail to satisfy the additional constraint;
   select a second set of classes having a highest predicted probability in the joint probability distribution; and
   generate, based on the second set of classes, a second database query.

9. The system of claim 7, wherein each class of the second plurality of classes corresponds to a column of the database.

10. The system of claim 7, wherein the first plurality of classes comprises a first class corresponding to a request to output a list and a second class corresponding to a request to output a count.

11. The system of claim 10, wherein a constraint of the plurality of constraints comprises a rule that the set of classes can contain either the first class or the second class but not both the first class and the second class.

12. A method comprising:
receiving input data;
retrieving a configuration for an MLA pipeline corresponding to the input data, wherein the MLA pipeline comprises a first machine learning algorithm (MLA), a second MLA, and one or more constraints, wherein each constraint of the one or more constraints comprises one or more user-selected predefined rules;
inputting only a first portion of the input data to the first MLA;
inputting only a second portion of the input data to the second MLA;
outputting, by the first MLA, a first probability distribution comprising a first plurality of classes and a probability associated with each class;
outputting, by the second MLA, a second probability distribution comprising a second plurality of classes and a probability associated with each class;
generating, based on the first probability distribution and the second probability distribution, a joint probability distribution;
removing, from the joint probability distribution, sets of classes that fail to satisfy the one or more constraints;
outputting the joint probability distribution
generating, based on the set of classes, a database query based on an output of the constraints and a schema of a database;
executing the database query on the database; and
transmitting for display, on a graphical user interface, results of the database query.

13. The method of claim 12, further comprising:
selecting, from the joint probability distribution, a set of classes having a highest predicted probability; and
outputting the set of classes.

14. The method of claim 12, further comprising:
selecting, from the joint probability distribution, a set of classes having a highest predicted probability; and
outputting a user interface based on the set of classes;
receiving user input;
generating, based on the user input, an additional constraint;
removing, from the joint probability distribution, sets of classes that fail to satisfy the additional constraint;
selecting, from the joint probability distribution, a second set of classes having a highest predicted probability; and
outputting a second user interface based on the second set of classes.

15. The method of claim 12, wherein a constraint of the one or more constraints comprises an instruction that two classes are incompatible.

16. The method of claim 12, wherein the configuration indicates inputs and outputs for the first MLA, the second MLA, and each of the one or more constraints.

17. The method of claim 12, wherein the first MLA was trained using a training dataset, wherein the training dataset comprises a plurality of training data points, and wherein each training data point of the plurality of training data points comprises input data and a class of the first plurality of classes.

18. The method of claim 17, wherein the second MLA was trained using a second training dataset, wherein the second training dataset comprises a second plurality of training data points, and wherein each training data point of the plurality of training data points comprises input data and a class of the second plurality of classes.

* * * * *